(12) United States Patent
Vedaste et al.

(10) Patent No.: US 11,867,511 B2
(45) Date of Patent: Jan. 9, 2024

(54) METHOD FOR SECURE AND ACCURATE MAPPING OF LOCATIONS AND ROUTES

(71) Applicants: Bihama Vedaste, San Jose, CA (US); Greg Richmond, Cupertino, CA (US)

(72) Inventors: Bihama Vedaste, San Jose, CA (US); Greg Richmond, Cupertino, CA (US)

( * ) Notice: Subject to any disclaimer, the term of this patent is extended or adjusted under 35 U.S.C. 154(b) by 581 days.

(21) Appl. No.: 17/069,682

(22) Filed: Oct. 13, 2020

(65) Prior Publication Data

US 2021/0108924 A1 Apr. 15, 2021

Related U.S. Application Data

(60) Provisional application No. 62/914,787, filed on Oct. 14, 2019.

(51) Int. Cl.
*H04W 4/02* (2018.01)
*G01C 21/20* (2006.01)
*G01C 21/00* (2006.01)
*G01C 21/32* (2006.01)

(52) U.S. Cl.
CPC ........... *G01C 21/20* (2013.01); *G01C 21/005* (2013.01); *G01C 21/32* (2013.01)

(58) Field of Classification Search
CPC ... B60W 50/10; G01C 21/30; G01C 21/3815; G01C 21/3682; H04W 4/024; H04W 4/021; G06T 7/10; G06Q 10/063118
See application file for complete search history.

(56) References Cited

U.S. PATENT DOCUMENTS

2019/0301891 A1* 10/2019 Rowitch ............ G01C 21/3694

* cited by examiner

*Primary Examiner* — Phuoc H Doan

(57) ABSTRACT

A method for creating a map navigable by human means through unmapped areas including footpaths, small alleyways, structural and geographical barriers is disclosed. Mobile position recording devices including for example global navigation satellite system (GNSS) receivers, accelerometers, and magnetic orientation circuits plus monitoring software and means for data storage are provided to individuals who then travel to various destinations on foot and/or by mechanically assisted means. The position recording devices record route and location information with sufficient detail to provide a navigable map of the routes taken. The routes of various individuals are combined to provide an area wide map of navigable routes and repeated routes are identified and averaged over time to provide increased route detail and accuracy. The location and route data are separated into public and private data and the identity of the service recipient is protected from disclosure to service providers.

20 Claims, 3 Drawing Sheets

METHOD FOR SECURE AND ACCURATE MAPPING OF LOCATIONS AND ROUTES

CROSS REFERENCES TO RELATED APPLICATIONS

This application claims the benefit of the U.S. Provisional Patent Application Ser. No. 62/914,787, titled METHOD FOR SECURE AND ACCURATE MAPPING OF LOCATIONS AND ROUTES and filed on Oct. 14, 2019, the content of which is hereby incorporated by reference herein in its entirety.

FIELD OF THE INVENTION

The present invention relates to a novel method for precise and secure mapping of locations and routes.

BACKGROUND OF THE INVENTION

Developing countries have large portions of their population living in areas that are only accessible by foot paths and at locations that do not have typical street addresses. This is even true in densely populated areas where housing was constructed without consideration for any type of vehicle access or numbering systems for building locations. Even in developed countries, a significant portion of the population lives in apartments or other dwellings that are geographically separate and connected by pathways but share a common street address. As a result, there is no map of such areas showing the best route to get from point A to point B or even where point A and point B are located. This prevents the population from taking advantage of various services including commercial delivery, installation or government services especially in the case of emergency.

Thus there exists a very compelling need to develop accurate maps of such areas that can be used to give route and location information to third parties who can deliver services through either of or a combination of foot and vehicle transportation. As an example, individuals are unable to have mail delivered to their homes and cannot take advantage of online internet ordering and delivery services. As another example, if they experience a health emergency, even if they provided global navigation satellite system (GNSS) location coordinates, the navigable route from the emergency service provider to that location would still be unknown.

SUMMARY OF THE INVENTION

The present invention provides a means for efficiently creating and maintaining accurate maps of various locations and routes as a combination of both foot paths and mechanical transportation paths including features important to the delivery of services. It also allows improved accuracy by combining multiple tracks for the same route by one or more individuals, including weighted averaging based on data quality. It also makes that information available to individuals and third party service providers in a format that maintains the privacy of individuals who do not want to be associated with a particular service provider or want to remain anonymous while still participating in services that benefit from accurate route and location data.

DETAILED DESCRIPTION OF THE INVENTION

Figure 1:
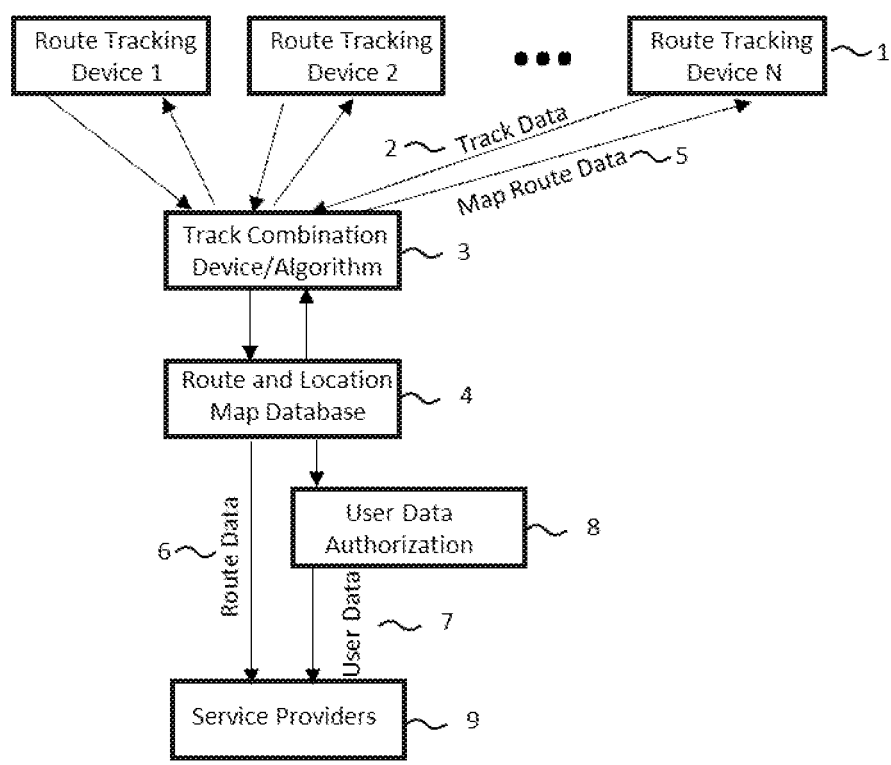
FIG. 1 shows the main components of the method for secure mapping of locations and routes.

A description of the invention follows. Referring to FIG. 1, one or more route tracking devices such as device 1 which has means to know its location, for example by wirelessly receiving Global Navigation Satellite System (GNSS) signals, can be carried by or attached to an individual or an individual's mechanical transportation device. It is obvious to one skilled in the art that the reference to GNSS signals may include the wireless signals from any type of wireless location system including but not limited to systems such as GPS (US), BeiDou/BDS (China), Galileo (Europe), GLONASS (Russia), IRNSS/NavIC (India), and QZSS (Japan). At the beginning of a route, the route tracking device is enabled to start recording among other things, the devices geographic location and altitude. Even if the individual is not moving, the device will periodically record then send the devices current location data. The recording or sending of repeated locations or locations within a confined radius is useful in determining map locations and points of interest where the individual spends time. For example, when the individual is at home for an extended period of time the device will record or send location points within the boundaries of the home multiple times. When this location and time pattern is combined with common human behavior such as resting at night, the data becomes useful in determining the location of the individual's home or other points of interest. Alternatively, the route tracking device might accept user input from the individual to name or label a location or route so that the recorded location point or route can also have a user specified name or label attached to it.

Again, referring to FIG. 1, as the individual begins to move and follow a particular route, the route tracking device will record or send among other data, the time, location and altitude of points along the route travelled. This set of data is hereinafter referred to as the Track Data 2. It should be noted that the track data may also include the tracking device identification number, accuracy information such as the number of and reception angle of GPS satellites used in determining a particular location point, model number of the tracking device, accelerometer parameters, magnetic orientation, photographs, video, or other useful information. The track data can be recorded within the route tracking device to be sent to the track combination device 3 at a later time when a communication method becomes available. Or the track data can be sent real time with or without some amount of delay while the individual is in route when a communication method is continuously or periodically available. Such communication methods include but are not limited to a direct wired ethernet connection to a device connected to the internet, or a wireless cellular or Bluetooth connection to a device connected to the internet.

One or more route tracking devices can be in operation simultaneously, either streaming track data or sending previously recorded track data once the route tracking device is connected to a communication channel. The plurality of track and location data streams is sent to the track combination device 3 through a communication channel. It should be noted that the track combination device 3 may be a combination of computing devices located in different places, such as storage and compute servers in different geographical locations that are typically connected to the internet, each receiving data from certain geographical areas or locations. Each of these receiving servers may perform a portion of or all of the track and location combination algorithm. The result of combining the route track data is to generate one or more route and location maps which are a combination of all or a bounded subset of the route track data received by the track combination device. The subset bounds of said route track data may be established by geographical area, accuracy, user groups or other distinguishing features.

The track combination algorithm used to combine the various track data sets received has several features. One feature is to recognize where individual sets of track data or subsets of track data overlap either as a crossing of two or more routes or as a repeated section of the same route. When the algorithm recognizes that two or more track data sets or subsets are from the same route or route subset, then the algorithm can average the data to improve the accuracy of that route or route subset. Improving the accuracy of the route or route subset is important especially when the route is narrow and only navigable on foot or small mechanical means such as bicycles and motorcycles through dense urban areas or densely vegetated areas where the route can be missed if not precisely followed.

Figure 2:
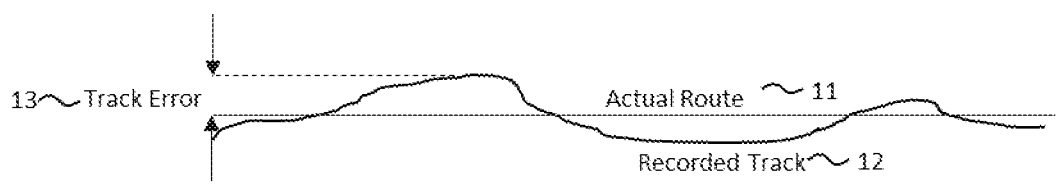
FIG. 2 shows the inaccuracy of an example, actual route verses the recorded track

Referring to FIG. 2 we can see for example that the actual route 11 is a straight line. However the route tracking device may report the location of the individual travelling along the actual route with some track error 13. This is due to the limited accuracy of the location tracking device which will store or send location data corresponding to the recorded track 12. Note that in some cases the location of the recorded track may be in areas inaccessible or dangerous to travel, or it may overlap with some other nearby route resulting in confusion if a person were to try and follow the recorded track. Therefore, it is desirable to eliminate the recorded track error. It is obvious to one skilled in the art that the actual track in FIG. 2 may not be the full route, but can be a subset of a longer route, or that the route or route subset may not be a straight line, but could be any other geometric shape or combinations of shapes such as arcs, ellipsoids, angles, piecewise linear, etc.

Figure 3:
FIG. 3 shows example results of averaging multiple tracks to more accurately map routes and locations

One method of eliminating the recorded track error is to average multiple sets or subsets of track data that correspond to the same actual route. These sets or subsets of track data may be from the same route tracking device, typically associated with the same individual traveling the route multiple times, or they may be from different route tracking devices, typically associated with different individuals traveling the same route. Referring to FIG. 3, there exist safe boundaries 24 for a particular route or route subset. These safe boundaries may correspond to physically or legally impassable barriers that must be avoided by someone wishing to travel along that route. The route combination algorithm can average the data points of track data sets corresponding to the same route to create the averaged track 25 shown in bold. This averaging can be a weighted average in which higher weight is given to the data sets with the best accuracy. For example, Track 2 22 has less variation along the route travelled and can be given more weight meaning it can count as more than one track in the averaging of track 1 21 through track N 23.

The accuracy of each data set, subset or point can be determined in multiple ways. One way is to include accuracy information with each location point or set of points in the track data. The accuracy can change along the route for example by a change in the number of GPS satellites being received and used in calculating a particular location point. Other ways to determine the accuracy of the data include but are not limited to comparing the motion of the dataset to the typical motion of an individual or mechanical transportation device. For example an individual will typically not make multiple short lateral moves back and forth when traveling along a route, or may not be able to travel fast enough to span the distance between two successive timestamped points in the dataset which would indicate that there is more error in those points than other data sets that adhere more closely to standard travel motion and rates.

Other ways to improve the accuracy of track data that is generated by GPS location receivers is to make use of GPS location data from a plurality of tracking devices one or more of which have their location accurately predetermined. For example if at least one of the tracking devices creating track data, including non-moving, fixed location data, is at a location with coordinates known to be more accurate than typical GPS accuracy, then any errors in the GPS accuracy caused by for example, intentional errors in the GPS signal as introduced by the US military, ionospheric charge or humidity variation in the path of the GPS signal, can be determined and then used to correct the GPS coordinate data from other tracking devices which are similarly affected. This technique is well known in the industry and is commonly referred to as differential GPS but typically consists of expensive, high accuracy stationary GPS receiver systems designed to individually calculate and then communicate GPS correction data to other tracking devices. In the mapping system described in this application, because there are multiple less expensive, normal accuracy route tracking devices, such as device 1, which could be for example mobile cellular phones, some of which are at accurately known locations, then the track combination device 3 can calculate the GPS location error based on either one or a plurality of such devices and make use of the error data to improve the accuracy of the map route and location data from other devices.

The track combination device can also send the differential GPS error correction compensation information as part of the map route data 5 that it sends back to the tracking devices, such as device 1, to allow the route tracking device to calculate its location with improved accuracy. Since the variables contributing to the GPS error change with time and some vary by both time and location, the error correction information must be communicated and made available within a specified time and to other tracking devices within geographical locations similarly affected by the variables in order to be useful.

Figure 4:
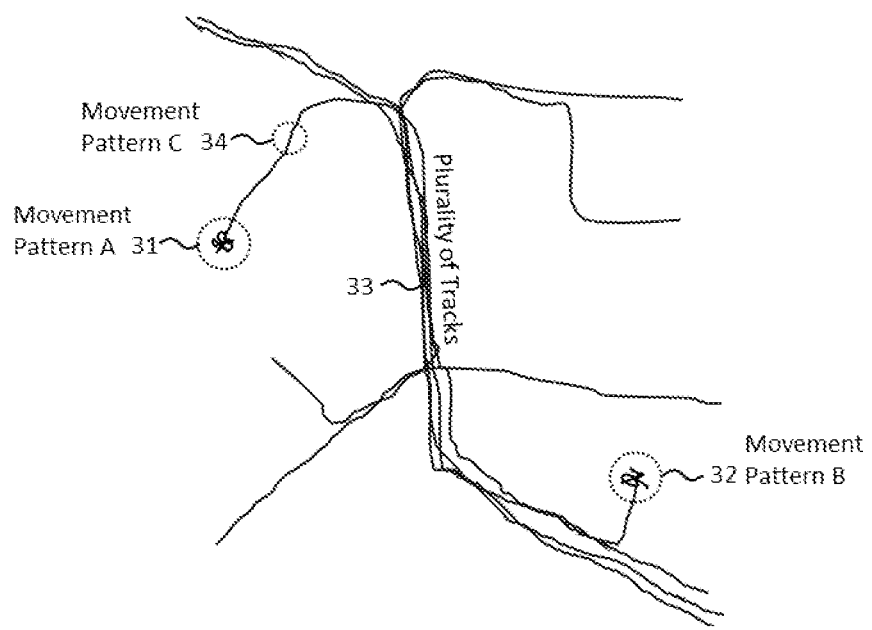
FIG. 4 shows an example of multiple routes with both common and unique routes from one or more users.
Figure 5:
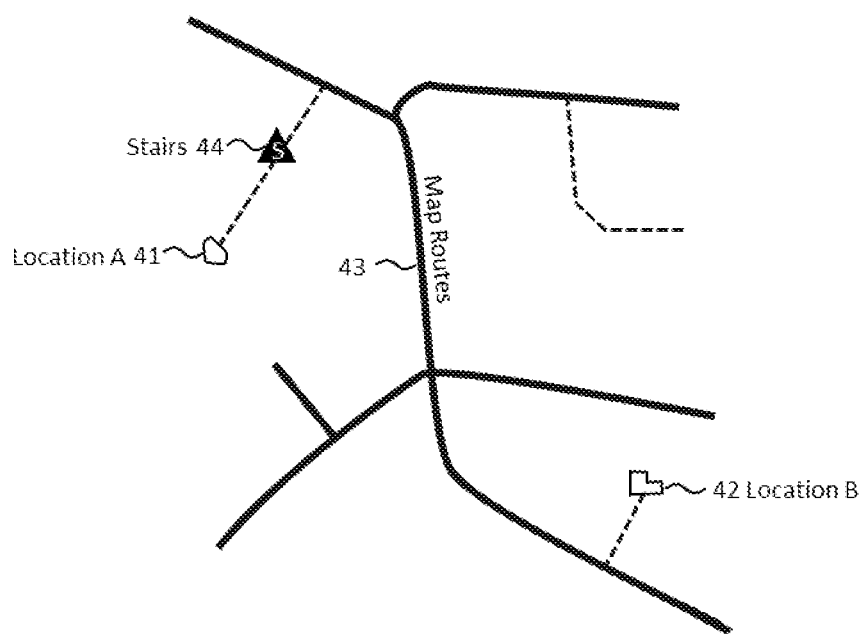
FIG. 5 shows the resulting example route and location map after averaging multiple routes.

Now referring to FIG. 4, the individual routes corresponding to a plurality of track data sets 33 are shown. None of these track data sets include both movement pattern A 31 and movement pattern B 32. Movement pattern A 31 will be processed by the route tracking device 1 to become location A 41 and movement pattern B 32 will be recognized as location B 42 as shown in FIG. 5. Even though no track data sets include both location A and location B, because the track data sets that include location A overlap or cross different track data sets that include location B, the route between location A and location B can be determined and mapped by the track combination device 3 using the track combination algorithm. In addition, the track combination device using the track combination algorithm can average the various tracks to improve the accuracy of the mapped route to better match the actual route. Over time, the number of track data sets that are used to calculate the map routes will continue to increase, and the corresponding error of the averaged route will be reduced, and the accuracy of those routes will increase. Since the linking of location A and location B requires that some portion of independent track data sets overlap, it may be desirable to require individuals using the route tracking device to originate or pass through a specific location at least once or a plurality of times to ensure the corresponding routes used by that individual are linked to and become part of the general map for the area the individual is located in. One such common location can be the location the user acquires the route tracking device.

It should be obvious to one skilled in the art that although FIG. 4 is drawn in two dimensions, the actual data can include the third dimension based on elevation. It is possible that two routes or locations will have the same or very similar two dimensional, X and Y, locations but differ only in the elevation or Z dimension, for example in apartment buildings with multiple floors or stories. In cases where GPS signals are weak or nonexistent, such as but not limited to being within apartment buildings, the tracking device's accelerometers, magnetic field orientation, or wireless communication location can be used to track an individual's motion or lack thereof within areas of poor GPS reception. As referenced here, wireless communication locations can be calculated from triangulation of multiple Radio Frequency or RF transmission paths to the same wireless receiver in the tracking device, said methodology often referred to as RF beam forming using multiple transmission antenna.

The fine motion capability of accelerometers combined with magnetic field orientation are known for tracking the movements of the human body, such as counting steps and turns. This information on it's own or in combination with other information such as GPS location and elevation information can be used to identify that a route contains stairs, ramps, elevators, or other vertical route elements. Even the number of stairs that is the individual steps that a user climbs can be discerned. An example of this is shown in FIG. 4 as movement pattern C 34 which is recorded as a combination of horizontal, X and Y, location coordinates, vertical coordinates, and time. The vertical coordinates are determined through GPS elevation, vertical accelerometer parameters, other vertical location means, or a combination of these. Movement pattern C can then be used to identify that a vertical transition is part of the route. Those elements can then be incorporated into the map, for example as stairs 44 shown in FIG. 5. In the same way, the repeated motions of pauses and turns always near or at the same location that are associated with opening and closing a door can identify the existence of a gate or doorway in the route.

The tracking device can automatically record the information of route elements such as stairs, gates, doors, elevators, etc. without further clarification, or it can ask the user for clarification or confirmation of the existence of these route elements. The request for clarification can be triggered when the tracking device's motion analysis algorithm identifies that such elements might exist, or the clarification can be part of the tracking device operation to always query the user for such information. Such information can include but is not limited to the request for or confirmation of the number of steps in a stairway or the width and height of stairways, doorways, elevators or hallways in a route. Information of such route elements is very useful in the delivery of certain items or services. The tracking device may also contain applications that instruct the user in how to measure such items with or without the tracking device being used to take the measurements.

Referring back to FIG. 1, the track combination device and algorithm 3 will continue to receive track data sets and when needed use them to add a new route or location or to improve the accuracy of existing routes or locations stored in the route and location map database 4. The track combination algorithm may have predefined accuracy goals that when achieved no longer require recalculation of a location or route to improve the accuracy. However, the additional track data is still useful, for example in determining the preferred route of an individual in travelling between two points or in assisting with changes in available routes due to failures in route elements, route congestion, construction, etc. The route tracking device can also accept information manually input by the user about such changes and then update the map with current route or location conditions.

FIG. 5 shows the route and location map created by the plurality of track data sets shown in FIG. 4, but also with improved accuracy of additional track data sets not shown in FIG. 4. Note that the resulting map routes can be comprised of piecewise linear combinations of straight lines and also include arcs of various radiuses. This resulting route and location map may have other attributes associated with various routes and locations that are derived from the track datasets. For example, routes passable only on foot or small mechanical means such as bicycles or scooters can be shown as dashed lines while routes that can be passed by larger means such as trucks and automobiles can be shown as continuous lines. Lines both dashed and continuous can have various thicknesses to indicate different widths or weight capacities. The map may also include photos or videos of various locations or routes, accuracy information of various locations and routes or route subsets based on the number and accuracy of the track data sets used to compute those routes and locations, etc. The routes and locations may be given names either manually, for example originating from the individuals carrying the route tracking devices, or auto generated by the track combination device algorithm. Such naming may include but is not limited to route or location orientations such as north, south, east, west; sequential alphanumeric numbering along a route such as 1234A Route9876B; GPS coordinates either in degrees, minutes, seconds or decimal degrees such as 40° 41' 21.4" N 74° 02' 40.2" W or 40.689263-74.044505; altitude relative to a common reference such as sea level; or any combination of these or subsets of these.

The route and location map database may be augmented by or linked to other map databases and the track combination device and algorithm will detect overlapping locations or routes to align and orient the different map databases into a combined map for seamless route identification. The track combination algorithm can also accept other sources of information for improving the accuracy of map routes. For example, satellite imagery can be used to identify barriers to routes such as buildings, fences, water features, or other objects and adjust the calculated routes to avoid these. The satellite imagery can be used to identify the actual path of the routes using color, grey scale, or other pattern contrast of soil, vegetation, hardscape, etc. to then be used as a virtual track data set that is aligned to and then averaged into the other track data sets already received.

These route and location maps are stored in the route and location map database 4 shown in FIG. 1. The route data 6 can be made available to various service providers 9, and may include encrypted identification codes to identify the source of the route data in an attempt to prevent unauthorized use of the route data or at least identification of the route data source when investigated. The individuals who have contributed to the route database by carrying or otherwise moving the route tracking devices along various routes and to various locations can also be given access to the map route data 5. These individuals may desire to have their location data protected from unauthorized use or access and therefore portions of the route and location database and the identification of a user's location or locations may be separate from the main route and location database. This separate private route and location database may be encrypted to protect the individual's privacy in the case of a malicious database hacking attack. A user's location may change and that user may optionally have their location associated with a single virtual location that they change manually, or have their location tracked automatically by the route tracking device. The user can also be given the option to disable the tracking device to protect certain location or track data from being recorded and assimilated into the map databases.

The user may also specify which services are authorized to access their private route and location data by updating their data access authorizations in the user data authorization database 8. If authorized, the user's data 7 can be sent to the service providers with or without the users identity, and optionally, the service providers can be provided with an application or other software that will receive encrypted private data and provide navigation instructions only to the person or vehicles that are providing the service. In this manner, the individual's location is not stored in the service providers premises or data storage systems and is protected from repeat or unauthorized use by the same service provider. The user may also specify that their delivery address for mail or shipped goods is virtual where their actual location is provided to one or more intermediary services that will schedule services at the user's location while keeping the individuals identity anonymous to provide one or more services such as mail forwarding, shipping, installation and repairs at their actual physical address.

What is claimed is:

1. A method to map physical features of routes and locations comprised of:
   means for collecting route data, said data including but not limited to such information as time, location, elevation, and other data at various points while moving along a path;
   means for storing the route data;
   means for transmitting the route data to a computing node that can combine this data with prior route data from the same route and other routes from the same user or a plurality of users to generate a map of the locations and routes.

2. The method in claim 1, wherein said combining of data includes identifying common paths within the route data and then averaging that path data with either equal or unequal weighting of the same path data from different route data sets based on parameters contained in the dataset that can be used to identify the measurement accuracy of the dataset alone or in combination with an algorithm that identifies superior accuracy of particular route datasets, said algorithm based on matching one or more typical motion attributes common to individuals on foot or assisted by mechanical means.

3. The method in claim 2, wherein the combining of data received from a plurality of devices includes data from at least one or more devices known to be at a precise location and the error between their received location and their precise location being calculated and used to correct the error and improve the accuracy of the track data from other devices.

4. The method in claim 1 wherein the means for collecting the route data is accomplished using a commercially available GNSS receiver or wireless smart phone device having one or more GNSS or other location service receivers.

5. The method in claim 4 wherein the means for collecting the route data using a GNSS receiver is augmented by accelerometer or magnetic orientation data or both accelerometer and magnetic orientation data.

6. The method in claim 4 wherein the means for collecting the route data includes an application that can send and receive data wirelessly through the internet to the computing node, either directly using one or more public communication services or through an intermediary communication protocol, such as but not limited to Bluetooth, to a device that is connected to the internet.

7. The method in claim 4 wherein the means for collecting the route data is augmented by location information obtained through cellular radio frequency transmission beam forming to the smart phone using multiple antenna.

8. The method in claim 1 wherein the route data includes data from paths navigated on foot, or human powered transportation devices, or mechanically powered transportation devices, or a combination of these.

9. The method in claim 1 wherein the route and location data accuracy is improved using knowledge of user behavior and lifestyle patterns.

10. The method in claim 1 wherein the map data also includes auto generated route and location names based on location and/or the names of nearby man made or naturally occurring landmarks.

11. The method in claim 1 wherein the map data also includes manually generated route names, location names, or route elements and conditions assigned by the person operating the route data collecting device.

12. The method in claim 1 wherein the compute node also has access to other, independent mapping databases, an algorithm to identify locations common to the computed map database and one or more independent databases and the ability to align and combine the databases into a single map database;
   wherein one such independent database includes satellite image information and the compute node has an algorithm to identify and locate routes and route barriers such as but not limited to trails, roads, building edges, fences, and water features, and use that information to adjust the map route and location data for increased accuracy.

13. A method to map physical features of routes and locations comprised of:
   Means provided to users for collecting route data, said data including but not limited to such information as time, location, elevation, and other data at various points while moving along a path;
   means for storing the route data;
   means for transmitting the route data to a computing node that can combine this data with prior route data from the same route and other routes from the same user or a plurality of users to generate a map of the locations and routes,
   said map data being stored with the user identities and private route and location data in an encrypted database separate from the general route database.

14. The method in claim 13 wherein the user can disable then reenable the means for collecting route data.

15. The method in claim 13 wherein only the general map route data is made available to third party service providers and portions of the user's private route and location data and identity are provided only to those service providers that the user has authorized for access to that portion of data.

16. The method in claim 15 wherein the user can update in real time through the internet or other communication means which service providers are authorized to have access to their private data.

17. The method in claim 16 wherein the user's physical location for services can change independent of an associated permanent or virtual address to enable the user to receive services, mail and deliveries at various locations without changing their permanent virtual address.

18. The method in claim 17 wherein the user's name remains anonymous by a third party arranging for services and deliveries to the physical location.

19. A method to map physical features of routes and locations comprised of:

means for collecting route data, said data including but not limited to such information as time, location, elevation, and other data at various points while moving along a path;

wherein the method for collecting the route data requires some collection devices to pass through a specific location while recording the route data so that the route can be connected to all other routes passing through that same location;

means for storing the route data;

means for transmitting the route data to a computing node that can combine this data with prior route data from the same route and other routes from the same user or a plurality of users to generate a map of the locations and routes.

20. The method in claim 19 wherein the specific location is a location also common to one or more independent map databases to allow the computing node to interconnect routes from two or more databases.

* * * * *